United States Patent
Li et al.

(10) Patent No.: US 11,162,323 B2
(45) Date of Patent: Nov. 2, 2021

(54) MULTI-SLUG STAGED METHOD FOR PLUGGING FRACTURED FORMATION

(71) Applicant: SOUTHWEST PETROLEUM UNIVERSITY, Chengdu (CN)

(72) Inventors: Gao Li, Chengdu (CN); Long He, Chengdu (CN); Zujun Jiang, Chengdu (CN); Rui Li, Chengdu (CN); Yi Feng, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/847,683

(22) Filed: Apr. 14, 2020

(65) Prior Publication Data

US 2020/0392809 A1 Dec. 17, 2020

(30) Foreign Application Priority Data

Jun. 12, 2019 (CN) .......................... 201910507951.0

(51) Int. Cl.
 *E21B 33/134* (2006.01)
 *C04B 14/20* (2006.01)
 (Continued)

(52) U.S. Cl.
 CPC ............ *E21B 33/134* (2013.01); *C04B 14/20* (2013.01); *C04B 18/18* (2013.01); *C04B 18/24* (2013.01); *C04B 18/248* (2013.01); *C04B 26/26* (2013.01); *C09K 8/426* (2013.01); *C09K 8/44* (2013.01); *E21B 33/138* (2013.01); *E21B 49/00* (2013.01); *C09K 2208/04* (2013.01)

(58) Field of Classification Search
 CPC ...... E21B 33/134; E21B 33/138; E21B 49/00; C04B 14/20; C04B 18/18; C04B 18/24; C04B 18/248; C04B 26/26; C09K 8/426; C09K 8/44; C09K 2208/04
 See application file for complete search history.

(56) References Cited

U.S. PATENT DOCUMENTS

| | | | |
|---|---|---|---|
| 6,283,210 B1* | 9/2001 | Soliman | E21B 33/138 166/270 |
| 2005/0124502 A1* | 6/2005 | Shaarpour | C09K 8/32 507/204 |

(Continued)

*Primary Examiner* — Silvana C Runyan
(74) *Attorney, Agent, or Firm* — Bayramoglu Law Offices LLC (57) ABSTRACT

A multi-slug staged method for plugging a fractured formation includes: determining an average opening of fractures around a well as D, an average particle size of bridging particles for first-stage plugging as $D_1$ that is slightly less than D, and average particle sizes of plugging particles for second to last-stage plugging as $D_2$-$D_n$, where $D_n$ is small enough to form a tight plugging layer; and sequentially injecting a plugging slurry only containing the bridging particles having the average particle size of $D_1$, plugging slurries containing the plugging particles having the average particle sizes of $D_2$-$D_{n-1}$, and a plugging slurry containing the plugging particles having the average particle size of $D_n$ into the fractures to achieve the fractured formation plugging.

7 Claims, 7 Drawing Sheets (51) Int. Cl.
*C04B 18/18* (2006.01)
*C04B 18/24* (2006.01)
*C04B 26/26* (2006.01)
*C09K 8/42* (2006.01)
*C09K 8/44* (2006.01)
*E21B 33/138* (2006.01)
*E21B 49/00* (2006.01)

(56) References Cited

U.S. PATENT DOCUMENTS

| | | | | |
|---|---|---|---|---|
| 2009/0286702 A1* | 11/2009 | Huang | ............... | C09K 8/44 |
| | | | | 507/260 |
| 2010/0243242 A1* | 9/2010 | Boney | ............... | E21B 43/26 |
| | | | | 166/250.01 |
| 2016/0069153 A1* | 3/2016 | Luo | ............... | C08F 220/06 |
| | | | | 166/293 |
| 2017/0328171 A1* | 11/2017 | Payne | ............... | C09K 8/74 |

* cited by examiner

FIG. 3 conventional plugging

FIG. 4A(Prior Art)

multi-slug staged plugging

multi-slug staged plugging

FIG. 5B

MULTI-SLUG STAGED METHOD FOR PLUGGING FRACTURED FORMATION

CROSS REFERENCE TO THE RELATED APPLICATIONS

This application is based upon and claims priority to Chinese Patent Application No. 201910507951.0, filed on Jun. 12, 2019, the entire contents of which are incorporated herein by reference.

TECHNICAL FIELD

The present invention relates to a multi-slug staged plugging method applicable to a fissured formation in drilling and plugging operations in the field of oil and gas field exploration and development.

BACKGROUND

When serious drilling fluid leakage occurs in the drilling process of petroleum engineering, it is often caused by the existence of natural fractures in the downhole or induced fractures caused by bottomhole pressure. In order to eliminate or reduce the leakage, it is necessary to plug fractures around a well according to the actual engineering situations. A common approach is that plugging materials of different particle sizes and types are added to drilling fluid according to information such as a leakage amount and a leakage location, and then injected into the downhole at one time to plug the fractures around the well. The basic plugging principle of this approach is that larger-sized particles form a bridge in a narrow part of each fracture, such that a fracture leakage passage is narrowed, and subsequently leaked particles gradually accumulate there to form plugging. At present, a conventional plugging method has achieved good results through continuous research and development of new plugging materials and optimization of plugging particle formulas. However, in terms of practical results, this conventional plugging method still has some shortcomings:

(1) changes in the pressure of a wellbore liquid column will cause dynamic deformations of formation fractures, causing changes in the originally effective plugging layer location, plugging state, and pressure bearing capacity, which may cause the plugging layer to be destroyed, resulting in repeated leakage;

(2) a plugging working fluid is doped with plugging particles of different particle sizes, and prior to the formation of compact plugging, some small-sized particles will leak into the formation through gaps between fracture passages and the large-sized particles, thereby causing the waste of the plugging particles and increasing the cost; and (3) for fractured reservoirs, fractures are main flow passages for oil and gas migration, and therefore the production of the fractured reservoirs is much higher than other reservoirs. In the process of plugging while drilling, leaked plugging particles enter the formation throat through fractures and plug a passage of oil and gas production, which greatly reduces the production and causes an intrusion damage of solid-phase particles.

In view of the shortcomings of the conventional plugging methods at home and abroad, the present invention proposes a multi-slug staged plugging method for a fractured formation in combination with a series of problems in the plugging process and laboratory simulation experiment researches.

SUMMARY

An object of the present invention is to provide a multi-slug staged plugging method for a fractured formation. The multi-slug staged plugging method applicable to the fractured formation is reliable in principle, simple in operation, capable of overcoming the defects and shortcomings caused by the conventional plugging process to a certain extent, plugging fractures around a well more effectively and saving the cost, and has a broad application prospect.

To fulfill the above technical object, the present invention adopts the following technical solutions.

A multi-slug staged plugging method applicable to a fractured formation sequentially comprises the following steps:

1), determining an average opening of fractures around a well as D according to logging data and the leakage amount, determining the number of stages of multi-stage plugging according to the average opening of the fractures, and a particle size of the plugging particles in each stage, one stage of plugging corresponding to one slug, wherein the process is as follows:

in order to facilitate bridging particles to enter the fractures around the well, first-stage plugging is performed by using bridging particles having a particle size being slightly smaller than D and an average particle size represented as $D_1$. After geometric calculation, the bridging particles enter the fractures around the well to form a bridging particle layer, and pores each having a diameter of $D_1/4$ are then formed among the bridging particles. Therefore, an average particle size $D_2$ of plugging particles used in second-stage plugging should be larger than $D_1/4$ and smaller than $D_1$. In order to form plugging as soon as possible, $D_2$ should be as close as possible to $D_1/4$. The particle size of each of the following stages of plugging particles is determined sequentially in the same way until the average particle size $D_n$ of the plugging particles the last stage is small enough to form a tight plugging layer. According to the particle size classification of commonly used plugging materials and the compact plugging principle, plugging particles in the last stage should be an ultrafine plugging agent having an average particle size $D_1$, being less than 0.1 mm.

The slug refers to a slug type injection method in a plugging process, which injects plugging slurry of a certain volume and a certain particle concentration into a drill pipe at one time. A plurality of slugs is adopted in the present invention, wherein each slug corresponds to a different particle size, such that an optimal plugging effect is achieved after particles are sequentially injected into the slugs.

2), Injecting plugging slurry only containing bridging particles having an average particle size of $D_1$ through slugs first to form a bridging particle layer.

In the conventional plugging materials, the plugging materials used for bridging are mainly rigid particles (such as walnut shells, calcium carbonate) and hard fibers (such as plastic fibers, animal hair). However, hard fibers are not conducive to controlling pore sizes of the bridging particle layer, so rigid particles having an average particle size of $D_1$ are adopted as the bridging particles in the present invention.

3), Injecting plugging slurry containing plugging particles having an average particle size of $D_2$ to $D_{n-1}$ in several times through a plurality of slugs to form a particle filling layer.

After the bridging particles enter the fractures around the well to form the bridging particle layer, an osmotic pressure difference still exists between the wellbore and the formation, such that subsequent secondary particles can migrate deeper into the fractures. Since the particle size of the subsequent particles is larger than the pores after first-stage bridging, the subsequent particles can continue to stagnate in the fractures. Among plugging particles from stage 2 to stage n, the plugging particles, such as fibers (such as animal hair and plant fibers), flaky materials (such as mica flakes and rice hulls), elastic particles (such as rubber particles and asphalt) which have corresponding particle sizes may be selected to improve the plugging stability.

4), Finally injecting plugging slurry containing plugging particles having an average particle size of $D_n$ through the slugs to form a tight plugging layer.

Based on the first few stages of plugging, only small leaky pores remain in flow spaces of the fractures. The plugging particles having the smallest particle granularity may be configured to be continuously accumulated on the basis of the first few particles to form a tight plugging layer. In the selection of plugging particles in the last stage, some special plugging agents (such as bentonite, lime milk and a high water loss plugging agent) can be added to increase the compactness.

The method of the present invention can avoid the problem of plugging failure caused by dynamic deformation of fractures to a certain extent.

In the case that the conventional plugging method is adopted, during the fracture opening process, the plugging layer originally formed in the fractures gets loose. The particles having smaller particle size in the plugging layer formed by conventional plugging will be lost with fracture passages, so that only particles having larger particle size remain in the original plugging layer, and the plugging fails. During the fracture closing process, the fracture opening is reduced, and the fracture walls will squeeze the plugging layer that has been formed, to crush rigid particles at the front end. However, the front end of the plugging layer mainly relies on single-particle bridging. The plugging layer formed by conventional plugging at this time will lose some of secondary particles because the particles at the front end are crushed.

However, in the case that the multi-slug staged plugging method of the present invention is adopted, the front section of the plugged location is completely composed of bridging particles having a larger particle size during the fracture opening process. Therefore, during the opening process, these particles continue to move towards the front ends of the fractures and continue to bridge at a certain location. Due to the stage-by-stage distribution of the subsequent particles, most of subsequent particles remain in the original location, such that the original plugging state can be maintained better. In the fracture closing process, after the bridging particles at the front end are crushed, the subsequent bridging particles will replace the locations of the crushed particles and continue to form bridging, such that the subsequent secondary particles will not be lost, and the plugging layer will be preserved more completely.

Compared with the prior art, the present invention has the following beneficial effects.

(1) The method of the present invention is more economical than conventional plugging. Firstly, the bridging particles having a large particle size are injected to avoid the leakage of particles having a small particle size through the fracture passages, which minimizes the waste of plugging particles and saves the plugging cost; secondly, plugging agents of different particle sizes are injected in several times, such that mixing tanks of smaller volumes can be used on site, thereby saving the facility cost.

(2) The method of the present invention has better plugging quality compared to conventional plugging. Firstly, the plugging layers formed by this method have been repeatedly stacked stage by stage, and have higher compressive and crushing strength; secondly, in the conventional plugging method, because large-sized particles are distributed at various locations in the plugging layers, the deformation capacity of the plugging layers is limited. However, in multi-slug staged plugging, only the front end of each plugging layer contains large-sized particles and has strong deformation capacity.

(3) The method of the present invention is more efficient than conventional plugging. Firstly, in terms of bridging success rate, the configurable particle concentration of the bridging particles in this method is higher than the concentration of large-sized particles in conventional plugging, and meanwhile, the concentration of the plugging particles once configured by this method is lower than that of conventional plugging, so this method can form bridging faster; secondly, in the process of fracture plugging, it is also necessary to consider the impact of particle sedimentation on plugging, that is, large-sized particles are more likely to settle. Therefore, this method can form bridging faster than conventional methods.

In drawings, reference symbols represent the following components: 1—drill pipe; 2—well wall; 3—drilling fluid; 4—plugging particles; 5—filling particles; 6—bridging particles; 7—fractures around a well; 8—multi-slug staged plugging area; 9—bridge particle layer; 10—filling particle layer; 11—tight plugging layer; 12—fracture opening location; 13—fracture closing location; 14—crushed particles.

DETAILED DESCRIPTION OF THE EMBODIMENTS

The present invention is further described below with reference to the accompanying drawings, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

Figure 1:
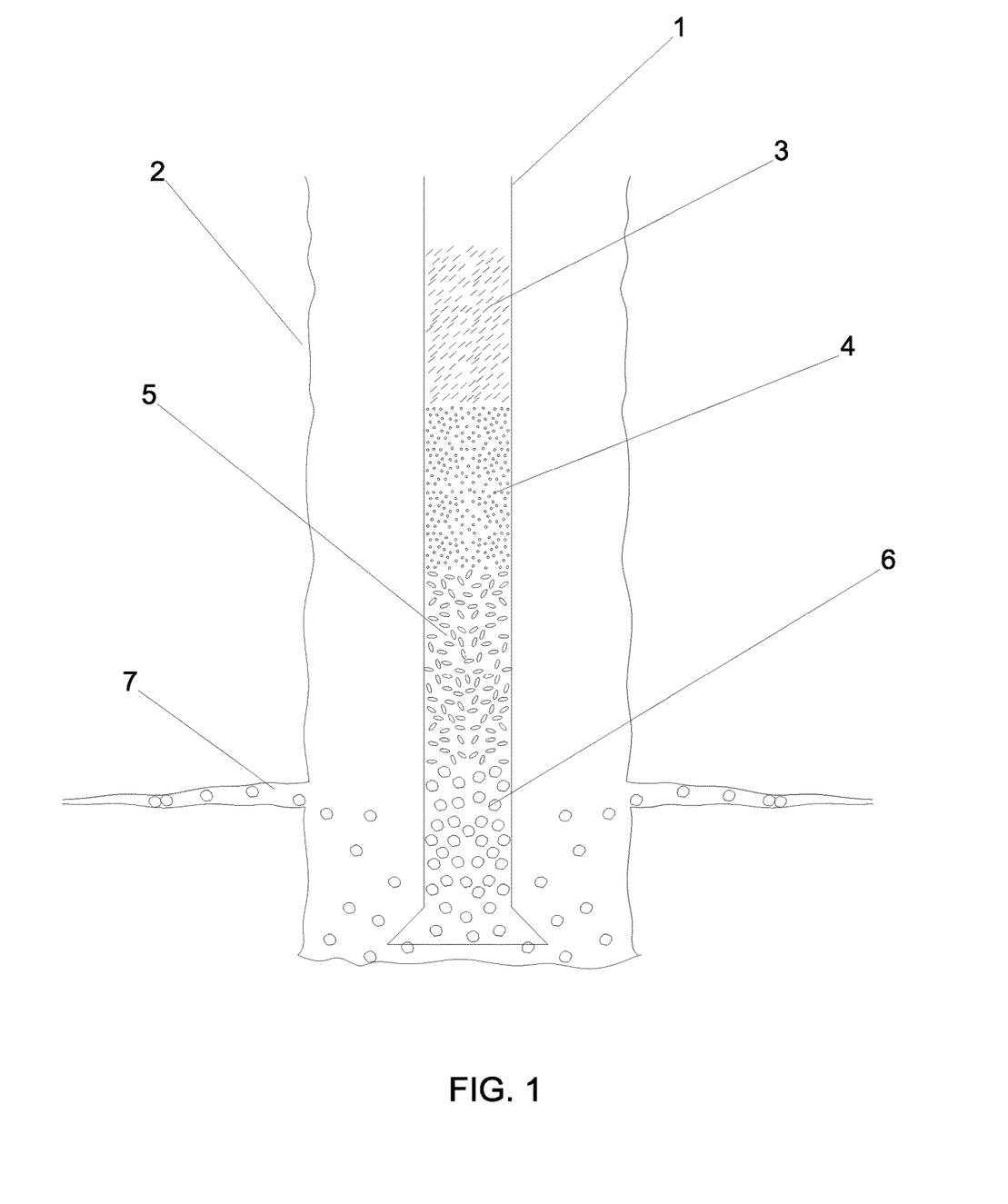
FIG. 1 is a flowchart of a multi-slug staged plugging method of the present invention (before plugging).
Figure 2:
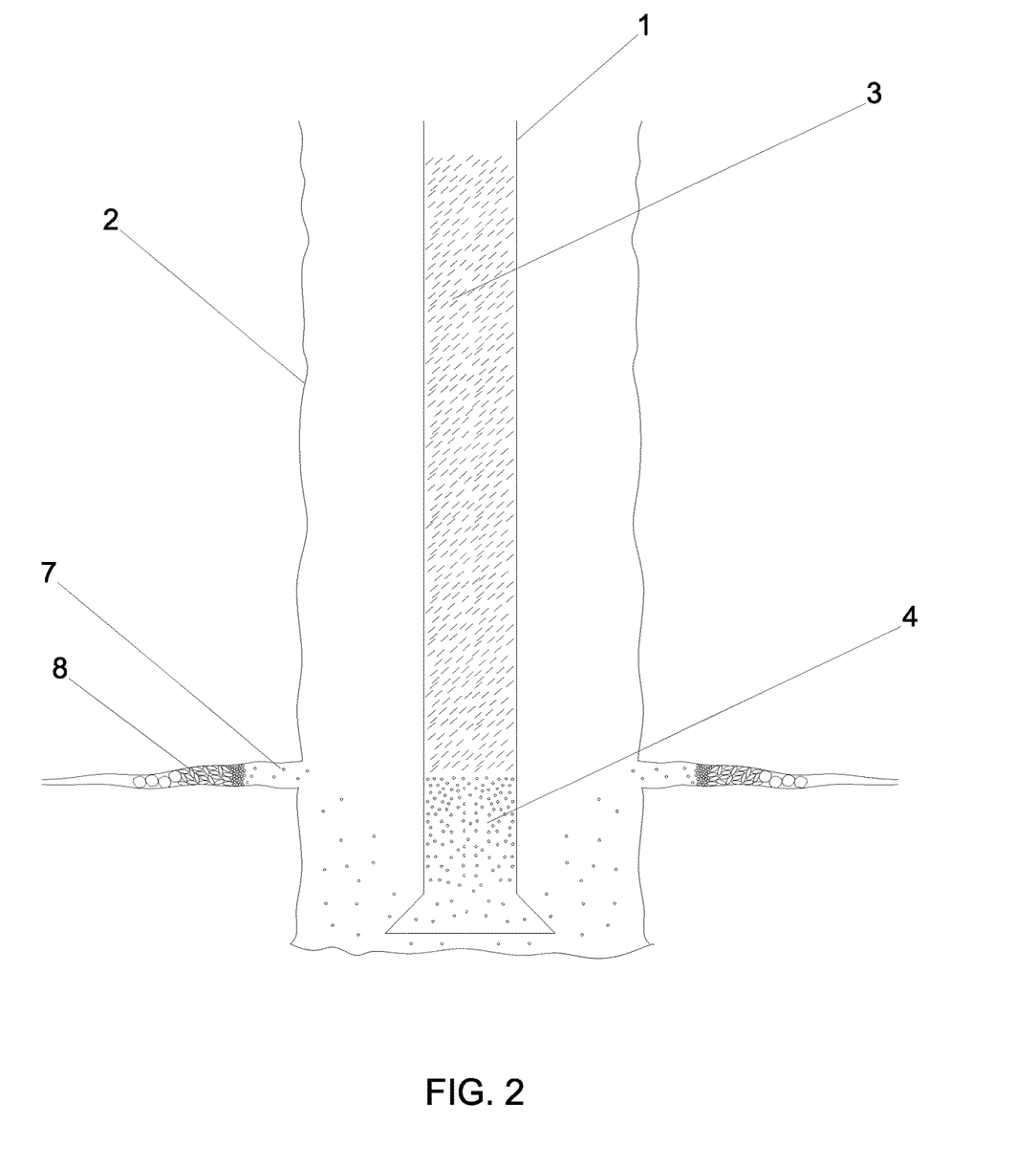
FIG. 2 is a flowchart of the multi-slug staged plugging method of the present invention (after plugging).

Referring to FIG. 1 and FIG. 2.

FIG. 1 and FIG. 2 are flowcharts of a multi-slug staged plugging method of the present invention before plugging and after plugging. During the drilling process, a drill pipe 1 is located in the center of a well wall 2, and a drilling fluid 3 enters the bottom of the well through the drill pipe 1, and then flows through an annulus between the drill pipe 1 and the well wall 2 and returns to the ground. When a formation is drilled open, natural fractures with sufficient openings are formed around the well, or when a fluid column pressure at the bottom of the well is excessively high to crush rocks around the well to a certain state and induce the formation of fractures, the leakage of the drilling fluid 3 will occur. As shown in FIG. 1, bridging particles 6, filling particles 5 and plugging particles 4 are sequentially injected into the drill pipe 1 through a plurality of slugs. The drilling fluid 3 free of plugging particles is located above the plugging particles 4. The plugging process is as follows: the bridging particles 6 first enter the fractures 7 around the well, and the filling particle 5 fill a flow space of the fractures 7 around the well stage by stage based on the bridging formed by the bridging particle 6; and finally, after the filling is fully completed, a tight plugging layer 11 is formed by plugging of the plugging particles, that is, a multi-stage staged plugging area 8 is finally formed, as shown in FIG. 2.

Figure 3:
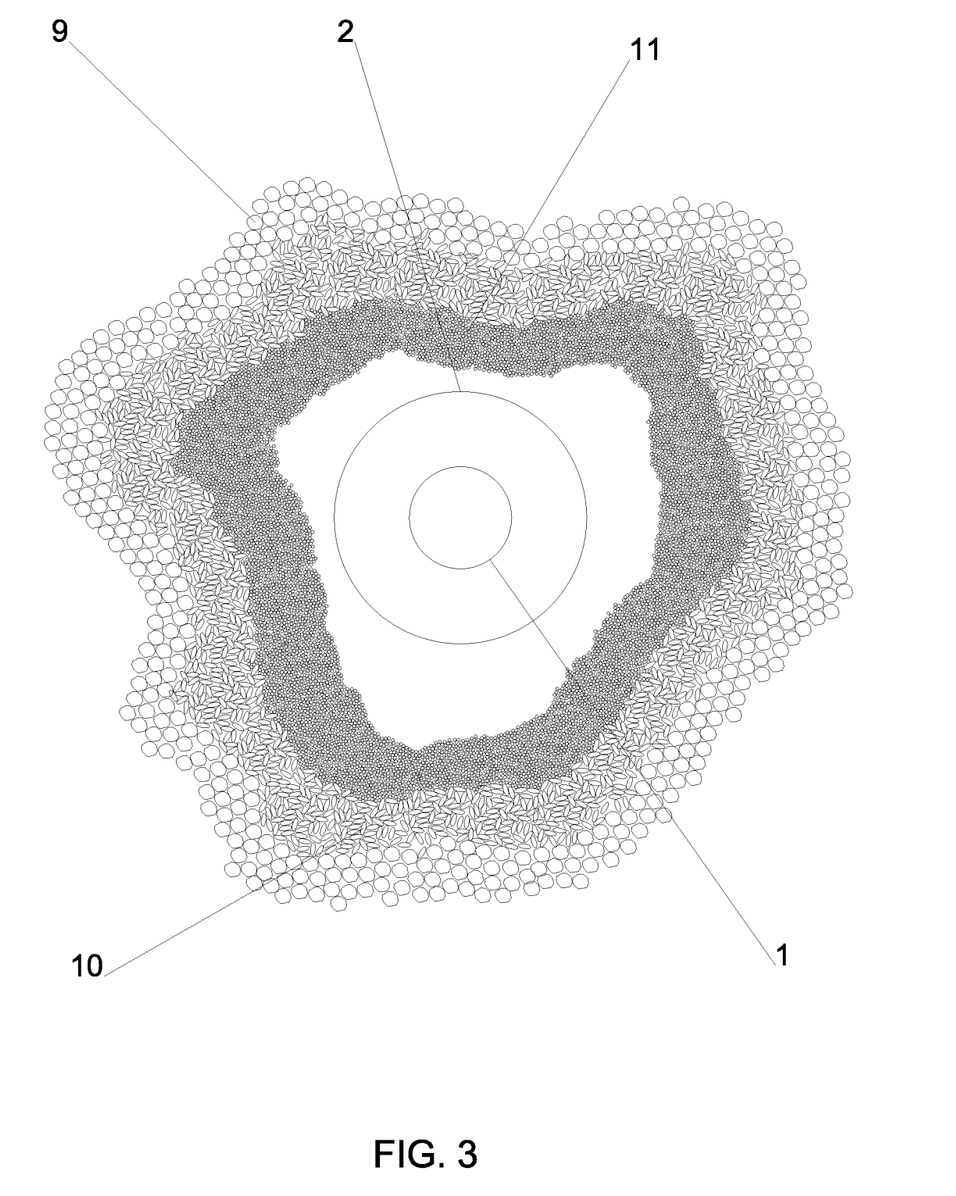
FIG. 3 is a structural schematic diagram of a multi-slug staged plugging area.

Referring to FIG. 3.

FIG. 3 is a structural schematic diagram of the multi-slug staged plugging area 8 formed in the fractures 7 around the well. In FIG. 3, the drill pipe 1 and the well wall 2 are shown in the middle part in sequence from inside to outside. In the fractures 7 around the well, the bridging particles 6 are formed outside to form a bridging particle layer 9, the filling particles 5 are located inside to form a filling particle layer 10, and the plugging particles 4 are located closest to the well wall to form a tight plugging layer 11.

Figure 4A:
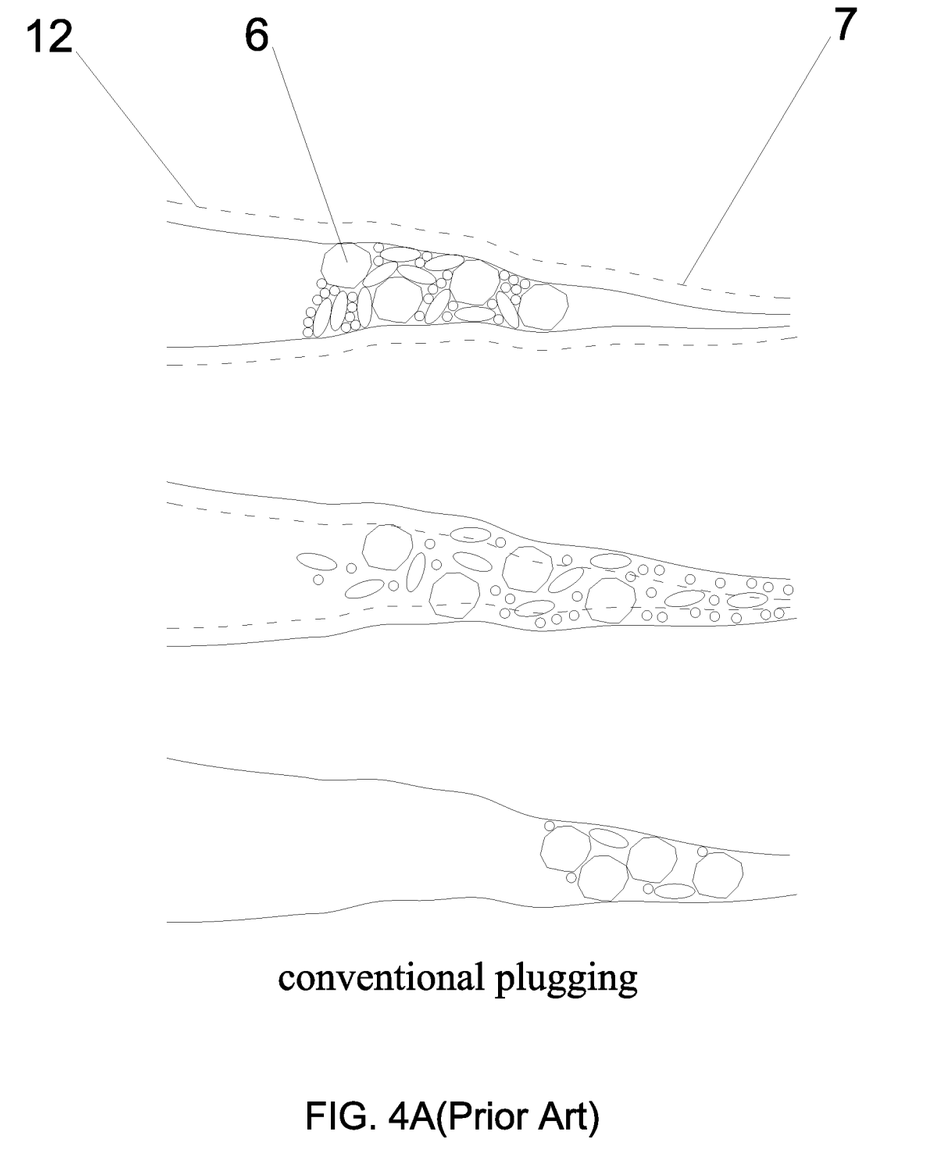
FIG. 4A and FIG. 4B are comparison diagrams of the effects of the method of the present invention and a conventional plugging method during the fracture opening process.
Figure 4B:
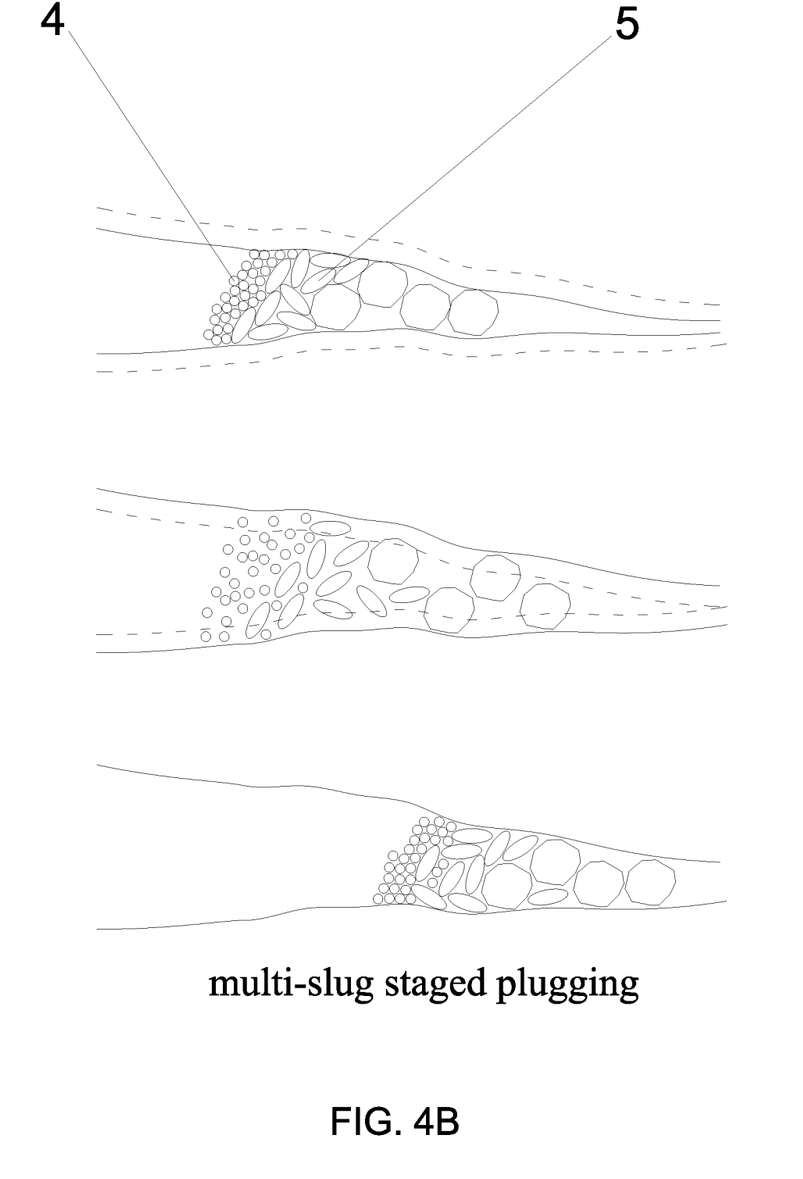

Referring to FIG. 4A and FIG. 4B.

FIG. 4A and FIG. 4B are comparison diagrams of the effects of the method of the present invention and a conventional plugging method during the fracture opening process. In FIG. 4A and FIG. 4B, dotted lines indicate fracture opening locations 12. As shown in FIG. 4A, after the plugging area is formed by a conventional plugging method, the bridging particles 6, the filling particles 5, and the plugging particles 4 are randomly distributed at various locations in the fractures 7 around the well. When the fractures around the well 7 are opened, part of the filling particles 5 and the plugging particles 4 in the plugging area will be lost along with passages of the fractures 7 around the well, causing the original plugging layer to be destroyed, and the plugging fails when the loss is serious. In this method of the present invention, as shown in FIG. 4B, because the front section of the plugging area is completely composed of the bridging particles 6 having a larger particle size, when the fractures 7 around the well open, the bridging particles 6 continue to move toward the front ends of the fractures 7 around the well and continue to bridge at the front ends of the fractures 7 around the well. Since the rear filling particles 5 and plugging particles 4 cannot be directly lost, most of the plugging particles remains still in the newly formed multi-slug staged plugging area 8, so the original plugging state can be maintained better.

Figure 5A:
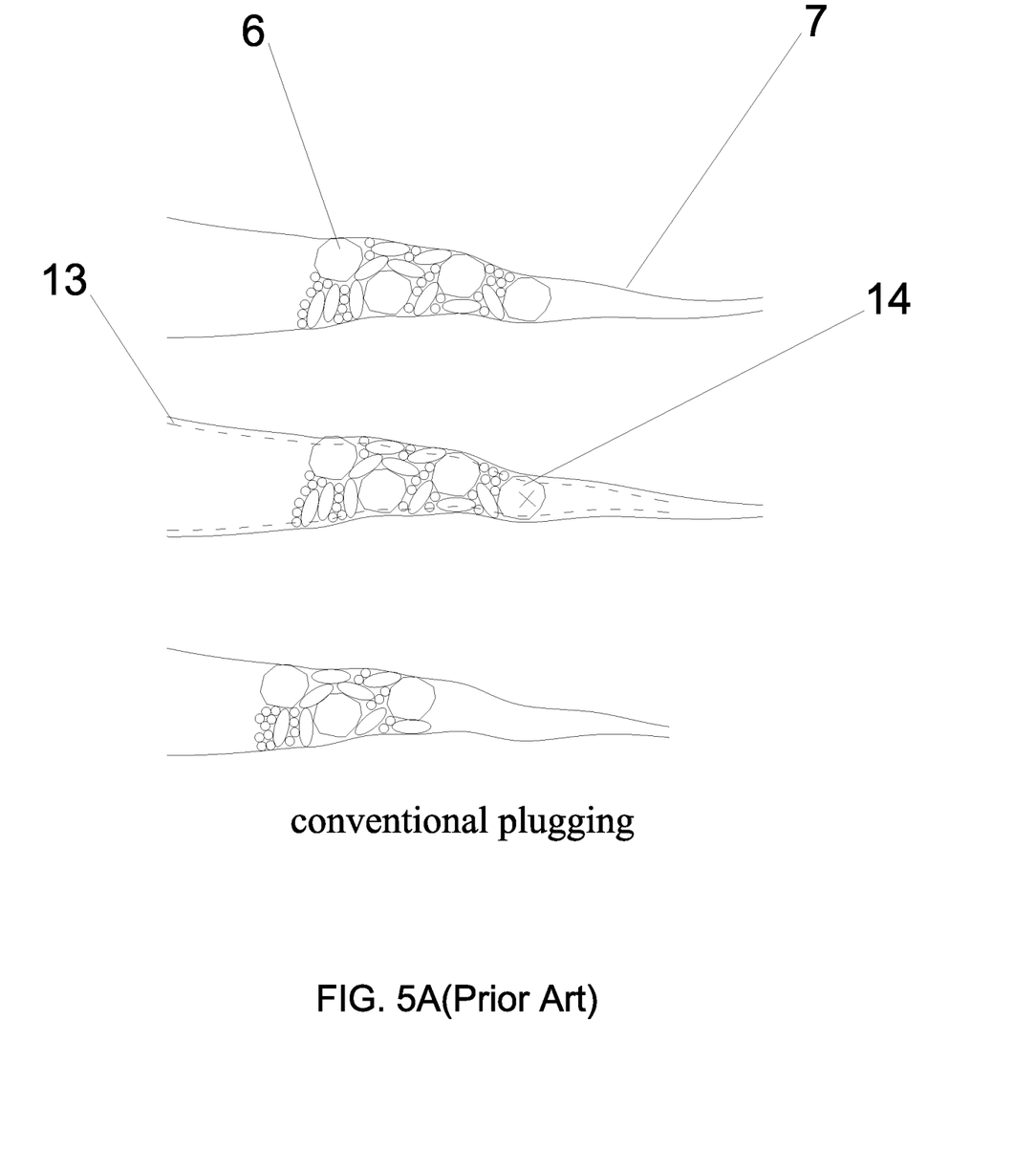
FIG. 5A and FIG. 5B are comparison diagrams of the effects of the method of the present invention and the conventional plugging method during the fracture closing process.
Figure 5B:
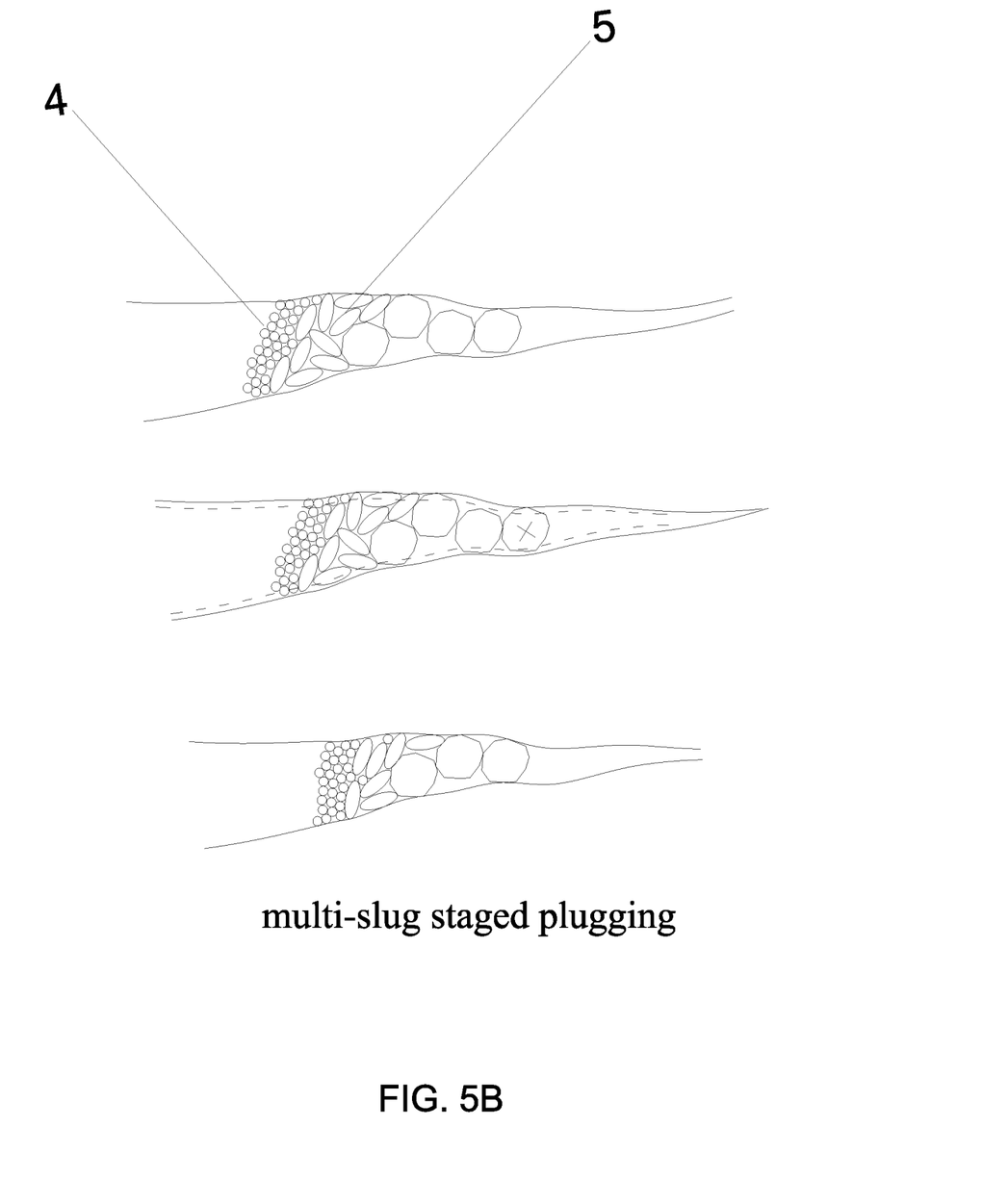

Referring to FIG. 5A and FIG. 5B.

FIG. 5A and FIG. 5B are comparison diagrams of the effects of the method of the present invention and a conventional plugging method during the fracture closing process. In FIG. 5A and FIG. 5B, dotted lines indicate fracture closure locations 13. As shown in FIG. 5A, after the plugging area is formed by the conventional plugging method, when the fractures are closed, the fracture wall surface will squeeze the plugging layer that has been formed, such that the rigid bridging particles 6 at the front part are crushed and the front end of the plugging layer is destroyed. A part of the filling particles 5 and the plugging particles 4 will be lost subsequently, and the plugging area will be destroyed when the loss is serious. However, in this method of the present invention, as shown in FIG. 5B, after the bridging particles 6 at the front end are crushed, the subsequent bridging particles 6 will move towards the front ends of the fractures and replace the locations of the crushed particles 14 and continue to form bridging, such that the rear filling particles 5 and the plugging particles 4 will not be lost. Therefore, compared with the conventional plugging, the multi-slug staged plugging area 8 is more stable.

What is claimed is:

1. A multi-slug staged method for plugging a fractured formation, sequentially comprising steps of:
    1) determining an average opening of fractures around a well as D according to logging data and a leakage amount of the fractures, determining a number of stages of a multi-stage plugging as n according to the average opening of the fractures, determining an average particle size $D_1$ of first plugging particles of first stage plugging of the multi-stage plugging, and respectively determining average particle sizes $D_2$-$D_n$ of second to $n^{th}$ plugging particles of second to $n^{th}$ stage plugging of the multi-stage plugging, wherein the first plugging particles are bridging particles; $D_1$ is smaller than D; $D_2$ is larger than $D_1/4$ and smaller than $D_1$; the $n^{th}$ plugging particles having the average particle size $D_n$ are configured to form a tight plugging layer; and one stage plugging of the multi-stage plugging corresponds to one slug;
    2) injecting a plugging slurry only containing the bridging particles having the average particle size $D_1$ into the fractures through a first slug to form a bridging particle layer, wherein the bridging particles are rigid particles;
    3) injecting plugging slurries respectively containing the second to $(n-1)^{th}$ plugging particles having the average particle sizes $D_2$-$D_{n-1}$ into the fractures in a plurality of times through respective second to $(n-1)^{th}$ slugs to form a particle filling layer; and
    4) finally injecting a plugging slurry containing the $n^{th}$ plugging particles having the average particle size $D_n$ into the fractures through an $n^{th}$ slug to form the tight plugging layer.

2. The multi-slug staged method for plugging the fractured formation according to claim 1, wherein in step 1), the average particle size $D_2$ of the second plugging particles used in the stage plugging approaches $D_1/4$.

3. The multi-slug staged method for plugging the fractured formation according to claim 1, wherein in step 1), the $n^{th}$ plugging particles used in the $n^{th}$ stage plugging are an ultrafine plugging agent having the average particle size $D_n$ being smaller than 0.1 mm.

4. The multi-slug staged method for plugging the fractured formation according to claim 1, wherein the rigid particles are walnut shells or calcium carbonate.

5. The multi-slug staged method for plugging the fractured formation according to claim 1, wherein in step 3), the second to $n^{th}$ plugging particles of the second to $n^{th}$ stage plugging are selected from the group consisting of fibers, flaky materials and elastic particles to improve plugging stability, wherein
    a particle size of the fibers, a particle size of the flaky materials or a particle size of the elastic particles corresponds to the average particle sizes $D_2$-$D_n$.

6. The multi-slug staged method for plugging the fractured formation according to claim 5, wherein the fibers are animal hairs or plant fibers, the flaky materials are mica flakes or rice husks, and the elastic particles are rubber particles or asphalt.

7. The multi-slug staged method for plugging the fractured formation according to claim 1, wherein in step 4), bentonite or lime milk is added to the $n^{th}$ plugging particles used in the $n^{th}$ stage plugging to increase a compactness.

\* \* \* \* \*